(12) United States Patent
Streib et al.

(10) Patent No.: US 7,584,651 B2
(45) Date of Patent: Sep. 8, 2009

(54) PROCEDURE TO DIAGNOSE A LEAK IN THE FUEL TANK IN A FUEL TANK VENTILATION SYSTEM

(75) Inventors: Martin Streib, Vaihingen (DE); Karl-Bernhard Lederle, Rutesheim (DE); Michael Pfeil, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 11/880,538

(22) Filed: Jul. 23, 2007

(65) Prior Publication Data
US 2008/0034843 A1 Feb. 14, 2008

(30) Foreign Application Priority Data
Jul. 24, 2006 (DE) .................... 10 2006 034 076

(51) Int. Cl.
G01M 3/26 (2006.01)
G01M 3/32 (2006.01)

(52) U.S. Cl. .................. 73/49.7; 73/40; 73/40.5 R; 702/50; 702/51

(58) Field of Classification Search .............. 73/40, 73/40.5 R, 49.7, 49.8; 702/50, 51
See application file for complete search history.

(56) References Cited

U.S. PATENT DOCUMENTS

| | | | | | |
|---|---|---|---|---|---|
| 5,261,379 | A | * | 11/1993 | Lipinski et al. | 123/520 |
| 5,263,462 | A | * | 11/1993 | Reddy | 123/520 |
| 5,297,529 | A | * | 3/1994 | Cook et al. | 123/520 |
| 5,383,437 | A | * | 1/1995 | Cook et al. | 123/520 |
| 5,390,645 | A | * | 2/1995 | Cook et al. | 123/520 |
| 5,490,414 | A | * | 2/1996 | Durschmidt et al. | 73/49.2 |
| 5,637,788 | A | * | 6/1997 | Remboski et al. | 73/40.5 R |
| 6,220,229 | B1 | * | 4/2001 | Kawamura et al. | 123/520 |
| 6,220,230 | B1 | * | 4/2001 | Kawamura et al. | 123/520 |
| 6,253,598 | B1 | * | 7/2001 | Weldon et al. | 73/40 |
| 6,260,410 | B1 | * | 7/2001 | Cook et al. | 73/114.39 |
| 6,276,343 | B1 | * | 8/2001 | Kawamura et al. | 123/520 |
| 6,334,355 | B1 | * | 1/2002 | Grieve et al. | 73/49.7 |
| 6,343,505 | B1 | * | 2/2002 | Cook et al. | 73/114.39 |
| 6,363,921 | B1 | * | 4/2002 | Cook et al. | 123/520 |

(Continued)

FOREIGN PATENT DOCUMENTS

DE 103 12 588 9/2004

*Primary Examiner*—David A. Rogers
(74) *Attorney, Agent, or Firm*—Merchant & Gould P.C.

(57) ABSTRACT

A method of diagnosing a fuel tank leak in a fuel tank ventilation system, comprising a fuel tank, an accumulator for fuel vapors and a fuel tank ventilation valve opening out into an intake manifold of an internal combustion engine, wherein the fuel tank, the accumulator and the fuel tank ventilation valve are connected by way of a system of lines and wherein the accumulator has an aeration line with a check valve, the method comprising:
  immediately before turning off the internal combustion engine, closing the check valve and opening the fuel tank ventilation valve to generate a vacuum in the fuel tank ventilation system;
  acquiring a vacuum degradation at specifiable points in time when the fuel tank ventilation valve is closed;
  opening of the check valve in order to bring about a pressure equilibrium with the ambient pressure;
  renewed closing of the check valve;
  acquiring a pressure increase emerging over at least a specifiable time interval and determination of a compensation variable; and
  inference about the presence of a leakage from behavior of the vacuum degradation over time, while taking into account behavior of the compensation variable over time.

11 Claims, 2 Drawing Sheets

U.S. PATENT DOCUMENTS

Figure 1:
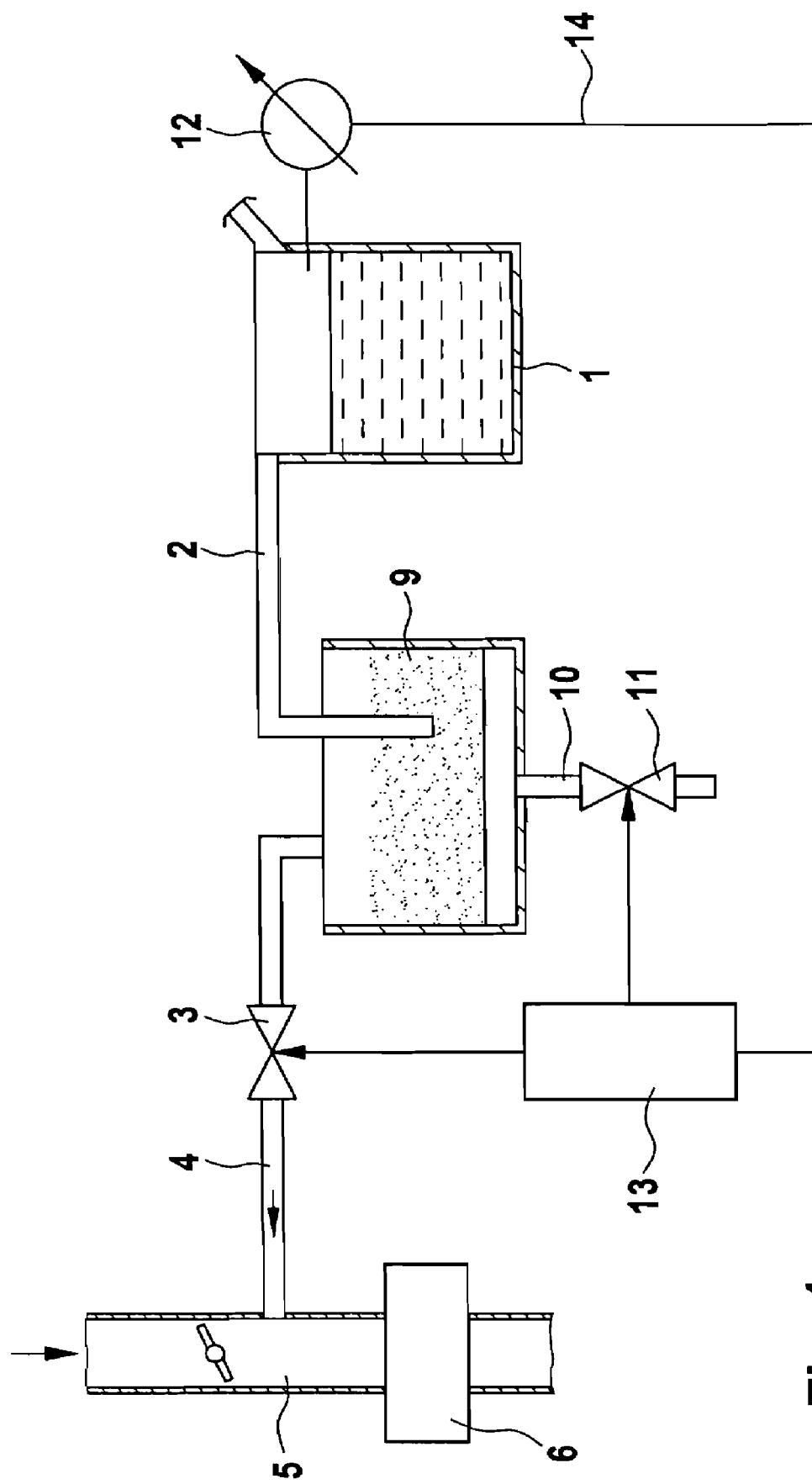

| | | | |
|---|---|---|---|
| 6,382,017 B1 * | 5/2002 | Majkowski et al. | 73/49.7 |
| 6,561,009 B1 * | 5/2003 | Perry et al. | 73/49.7 |
| 6,564,615 B1 * | 5/2003 | Carter | 73/49.2 |
| 6,868,732 B2 * | 3/2005 | Everingham | 73/717 |
| 6,880,383 B2 * | 4/2005 | Mc Lain et al. | 73/49.2 |
| 2003/0000290 A1 * | 1/2003 | Weldon et al. | 73/49.7 |
| 2003/0079533 A1 * | 5/2003 | Cook et al. | 73/118.2 |
| 2008/0034843 A1 * | 2/2008 | Streib et al. | 73/40 |

* cited by examiner

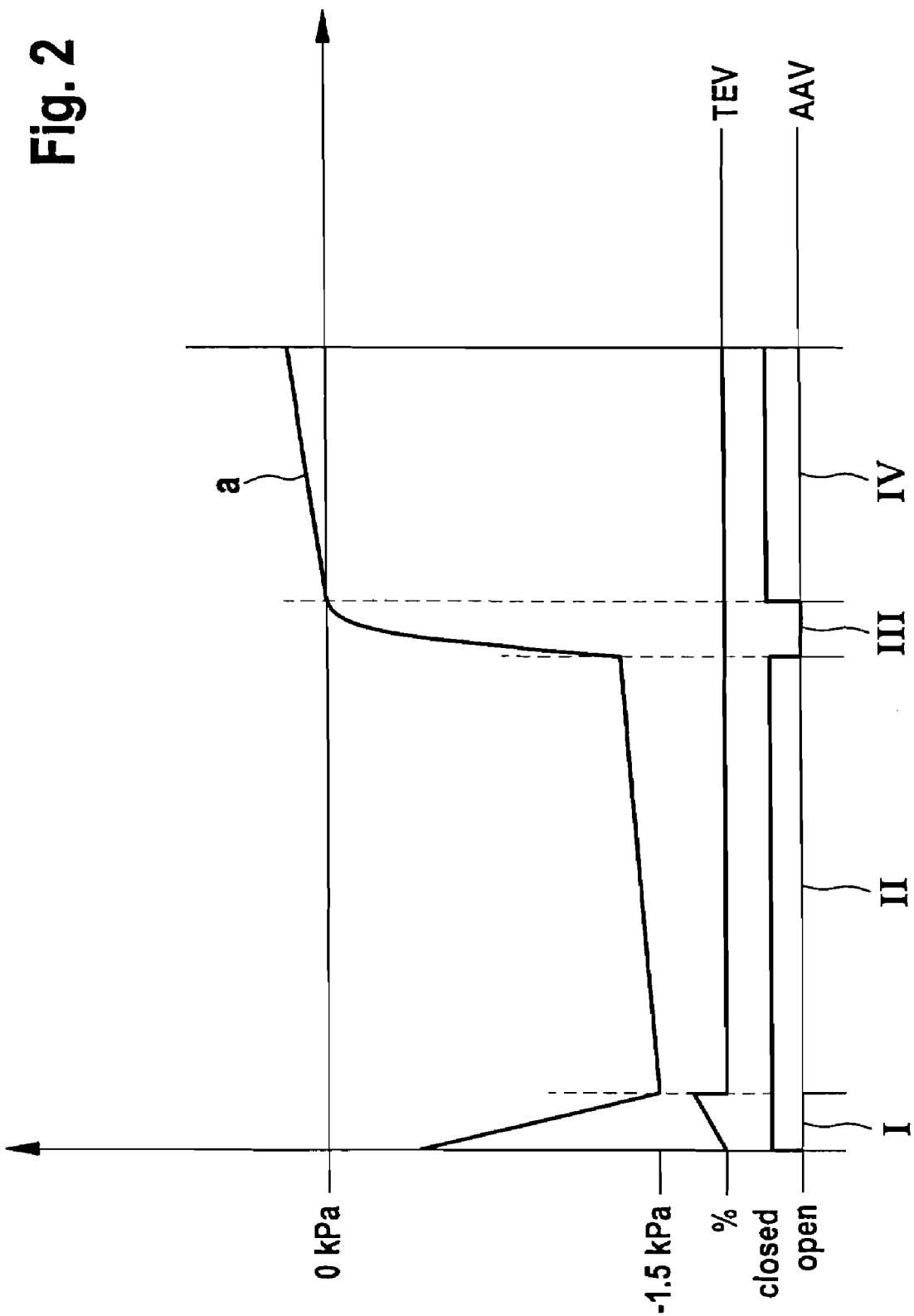

PROCEDURE TO DIAGNOSE A LEAK IN THE FUEL TANK IN A FUEL TANK VENTILATION SYSTEM

The procedure emanates from a procedure according to the class of the independent claim 1.

A procedure to diagnose a leak in the fuel tank has already been made known from the German patent DE 103 12 588 A1. In this known procedure, the vacuum in the fuel tank is generated immediately before turning off the internal combustion engine, and the diagnosis of a fuel tank leak is subsequently implemented. The diagnosis of a fuel tank leak is significantly simplified because the so-called vacuum existing in the intake manifold of the internal combustion engine is used for the generation of the vacuum. For that reason, no accessory pump for the generation of the vacuum nor an accumulator or the like is necessary.

The procedure to diagnose a leak in the fuel tank makes an inference about the functional capability of the fuel tank, especially the impermeability of the tank, on the basis of the system response after setting up the vacuum in the tank. An overpressure or vacuum with respect to the surroundings can be offset by a check valve, which is still open at this point in time. The check valve is subsequently closed and the fuel system of the motor vehicle is thereby separated from the outside world. The increase in pressure measured thereby over the time, the so-called compensation gradient, provides information about the outgassing rates prevailing in the fuel tank and is stored initially. When the fuel tank ventilation valve is opened, a vacuum is then generated in the fuel tank by using the intake manifold vacuum. The tank is then subsequently closed. By means of a pressure sensor, the vacuum degradation is measured and an inference is made about the presence of a leakage. The previously measured compensation gradient is used as a correction variable for the improvement of the diagnosis.

This diagnostic procedure has to be implemented on a motor vehicle at rest in order to make a sufficient degree of accuracy possible. The procedure additionally requires the operation of the internal combustion engine for the vacuum degradation resulting from the intake manifold vacuum. It is therefore problematic if the internal combustion engine of the motor vehicle is turned off before the necessary vacuum has been achieved. In this case, a diagnosis is not possible. This has a negative effect on the desired diagnostic frequency. The deployment of such a procedure is particularly problematic in motor vehicles with a hybrid-electric power train or with start-stop technology, where a diagnosis of this kind is only limited or not possible at all. This is the case because the internal combustion engine would have to be started in various operating states only for the purpose of the diagnosis, which once again would have a negative effect on the fuel consumption of the motor vehicle.

The procedure according to the invention with the characteristics of claim 1 has in contrast the advantage that the diagnostic frequency is significantly increased by shortening the diagnostic time. The procedure is moreover suitable for deployment in hybrid vehicles or motor vehicles with start-stop technology.

The basic concept of the invention at hand is to implement the vacuum degradation right at the beginning of the fuel tank leak diagnosis. In so doing, a waiting time does not arise until pressure equalization; and a vacuum possibly still present in the tank, for example as a result of a previous fuel tank ventilation phase, can be utilized.

The vacuum degradation occurs when the check valve is closed and the fuel tank ventilation valve is open. Thereafter the fuel tank ventilation valve is closed and the vacuum degradation is acquired at predetermined points in time. The check valve is opened after the vacuum degradation has been concluded in order to bring about an equalization of pressure with the ambient pressure. After a renewed closing of the check valve, the pressure arising in the in the fuel tank ventilation system is additionally acquired over at least one predetermined time interval; whereby it should be noted here that the acquisition of the vacuum degradation at predetermined points in time means both that the vacuum degradation takes place at some few, in the extreme case at two, points in time or continuously over a time interval. In corresponding fashion the pressure arising in the fuel tank ventilation system can take place in one or also in multiple time intervals. An inference about the presence of a leakage can then be made from the behavior of the vacuum degradation over time as well as from the behavior of the compensation variable over time.

This procedure has the advantage of not requiring any additional components, such as pressure sources, pressure sensors or the like. In this connection it is also very advantageous that the running time of the internal combustion engine necessary to generate the vacuum is reduced. The procedure can, therefore, also be deployed in hybrid vehicles or in motor vehicles with start-stop modes of operation.

It is particularly advantageous that the diagnostic accuracy is also improved by the altered diagnostic sequence. In the procedure known from the state of the art, for example in the procedure known from the German patent DE 103 12 588 A1, hydrocarbons are removed from the fuel tank ambiance between the measurement of the compensation gradient and the vacuum degradation. In so doing, the partial pressure of the hydrocarbons in the fuel tank ambiance is reduced, while the hydrocarbon vapor pressure remains constant. That in turn affects the outgassing of the fuel as the system attempts to come into equilibrium. The outgassing during the vacuum degradation tends, therefore, to be greater than when measuring the compensation gradient, whereby the result is distorted.

With the diagnostic sequence according to the independent claim 1, the measurement of the compensation variable results in contrast at the same hydrocarbon partial pressure as during the measurement of the vacuum degradation. The extraction of hydrocarbons occurs before the vacuum degradation, whereas only ambient air flows into the system between the vacuum degradation and the measurement of the compensation variable. This air has, however, absolutely no affect on the partial pressure of the hydrocarbons; and the outgassing when measuring the vacuum degradation and the compensation variable is, therefore, the same.

By means of the steps presented in the dependent claims, advantageous modifications and improvements of the procedure stated in the independent claim are possible.

Variables, which differ greatly, are a possibility as compensation variables, for example the time integral of the pressure over the specifiable time or preferably the compensation gradient, which immediately allows for inferences about an outgassing of fuel.

The vacuum is advantageously set to a constant value, whereby the closed-loop control of the vacuum to a constant value takes place by means of a two-step control or a continuous closed-loop control. This is done because the vacuum in the fuel tank can be controlled in this way in a closed-loop with a small control deviation around the predetermined vacuum.

The acquisition of the behavior over time of the vacuum takes place preferably while the internal combustion engine is turned off. In this way the diagnostic accuracy is increased.

The generation of the vacuum in the fuel tank occurs preferably only if a diagnostic signal is constructed in the engine management system. An advantageous operating state of the internal combustion engine can in this way be used for the diagnosis.

Provision is made for this reason in a form of embodiment for the diagnostic signal to be produced as soon as a forthcoming shutdown of the internal combustion engine is presumed from the parameters of the engine management system. In so doing, it is possible to build up the vacuum in the fuel tank only shortly before turning off the internal combustion engine.

The internal combustion engine is additionally only then turned off if at least one parameter, which characterizes the specifiable vacuum in the fuel tank ventilation system, has been produced. Preferably the internal combustion engine is turned off only after a time delay in the actuation of the switching equipment responsible for turning off the internal combustion engine. In this way, sufficient time remains to build up the desired vacuum in the fuel tank system.

The vacuum is advantageously measured in the fuel tank by a pressure sensor, which also monitors the pressure flow in the fuel tank ventilation system.

Examples of embodiment of the invention are depicted in the diagrams and are explained in detail in the following description.

The following are shown:

FIG. 1 simplified a known ventilation system from the state of the art and

FIG. 2 the pressure in the fuel tank ventilation system plotted against time in a procedure according to the invention to diagnose a fuel tank leak.

A fuel tank 1 is connected by way of a ventilation line 2, a fuel tank ventilation valve 3 and a suction line 4 at least indirectly with a so-called intake manifold 5 of an internal combustion engine 6. An accumulator 9, which in a known manner temporarily takes up volatilized fuel from the fuel tank 1, can, for example, be disposed in the ventilation line 2. The accumulator 9 contains fuel adsorbing material, for example activated charcoal. The accumulator 9 is connected to the atmosphere by way of an aeration line. The aeration line 10 has a check valve 11, for example a cut-off valve.

A pressure sensor 12 measures the pressure in the fuel tank 1 and transmits the signal by way of a signal line 14 to an electronic engine management system 13. The pressure sensor 12 is, for example, a differential pressure sensor. It can also be implemented as an absolute pressure sensor. The engine management system 13 is connected to the fuel tank ventilation valve 3 and the check valve 11 by way of additional signal lines and can actuate the fuel tank ventilation valve 3 and the check valve 11 to open or close.

The accumulator 9 temporarily takes up volatilized fuel from the fuel tank 1 in a loading phase. The loading phase exists if the internal combustion engine 6 is not running, and the motor vehicle, for example, is parked in a parking lot. After the loading phase, after starting the internal combustion engine 6, the fuel tank ventilation valve 3 is opened in a flushing phase; and fresh air is drawn by means of a vacuum in the intake manifold 5 across the aeration line 10 and through the accumulator 9. The fuel adsorbent material of the accumulator 9 gives off in the process the fuel, which was taken up, to the fresh air. This process is denoted as desorption. A fuel-air mixture accrues thereby, which consists of fresh air and fuel given off by the accumulator 9. The volumetric flow of the fuel-air mixture is also denoted as the flush volumetric flow. The flush volumetric flow travels across the opened fuel tank ventilation valve 3 into the intake manifold 5 and is supplied to the combustion in the internal combustion engine 6.

The procedure according to the invention to diagnose a fuel tank leak is implemented by means of the tank ventilation device, which is described. The procedure to diagnose a tank leak according to the invention serves the purpose of recognizing a leak in the fuel tank 1 including the ventilation line 2, the aeration line 10 and the accumulator 9 as well as the fuel tank ventilation valve 3 and the check valve 11. Volatilized fuel could enter into the atmosphere through such a leak and lead to high hydrocarbon emissions.

In the procedure according to the invention, a vacuum is generated right at the beginning of the fuel tank diagnosis. For this purpose the check valve 11 is initially closed and the fuel tank ventilation valve 3 is opened for a brief period when the internal combustion engine is running. This time period is denoted in FIG. 2 with Roman numeral I; whereby with the notations AAV and TEV, the switching statuses in relation to the time are denoted for the check valve (AAV) 3 and the fuel tank ventilation valve (TEV) 2.

The internal combustion engine can be turned off in a time period denoted with Roman numeral II. It can, however,—and this is to be pointed out—also still continue to be in operation. In this status, the fuel tank ventilation valve 3 is closed, while the check valve 11 continues to remain closed. In this phase a vacuum degradation occurs in the fuel tank ventilation system. This vacuum degradation is acquired by the pressure sensor 12 and stored in an (unspecified) storage device of the engine management system 13.

The check valve 11 is then opened in a time period, which in FIG. 2 is denoted with Roman numeral III, until pressure equalization with the ambient air is achieved. In FIG. 2 the ambient air pressure is depicted with a line 0 kPa.

In a time period following thereafter denoted in FIG. 2 with Roman numeral IV, the check valve 11 is again closed. A compensation gradient, which in FIG. 2 is denoted with the letter a, is ascertained by plotting the pressure increase, which emerges from this situation, against the time.

From the behavior of the vacuum degradation over time as well as that of the pressure gradient a over time, with which the vacuum degradation is corrected, an inference is made about the presence of a leakage. If the vacuum degradation, for example, exceeds a predetermined threshold value, a leak can be inferred.

The vacuum in the fuel tank ventilation system is adjusted by the engine management system 13 by means of intermittent actuation of the fuel tank ventilation valve 3 when the check valve 11 is closed. A two-step control is preferably deployed in this instance. The fuel tank ventilation valve 3 is then actuated to open or close in such a way that the vacuum in the fuel tank is approximately constantly maintained at the predetermined and specifiable value. The vacuum degradation ensues at the same time, which is initiated by a diagnostic signal in the engine management module 13. In so doing, the diagnostic signal is generated as soon as a forthcoming shutdown of the internal combustion engine 6 is presumed from the parameters of the engine management system. The shutdown of the internal combustion engine 6, therefore, results from the parameters of the engine management system, for example from the engine rotational speed or from the mode of operation of the internal combustion engine 6, whereby with certain likelihood it is anticipated. If, for example, the rotational speed of the internal combustion engine 6 remains beneath a predetermined value for a predetermined time period, a forthcoming shutdown of the internal combustion engine 6 can be presumed. In this case, the shutdown signal is emitted, which initiates the buildup of the vacuum in the fuel tank when the internal combustion engine 6 is still running by the closing of the check valve 11 and the opening of the fuel tank ventilation valve 3. It is also possible to recognize the forthcoming shutdown of the internal combustion engine 6 by the driver's actuation of the switching equipment to turn off the internal combustion engine 6 and in so doing to construct the shutdown signal. In order that the time is sufficient for the buildup of the predetermined vacuum in the fuel tank 1 and for the implementation of the diagnosis, the internal combustion engine 6 is only then turned off if the predetermined vacuum is achieved in the fuel tank 1. The shutdown of the internal combustion engine 6 only then occurs in this example of embodiment with a time delay for the driver's actuation of the switching equipment to turn off the internal combustion engine 6.

By means of the vacuum buildup right at the beginning of the fuel tank leak diagnosis, already existing vacuums in the intake manifold 5 can, for example, be utilized. The engine's running time to generate the vacuum is thereby reduced, which in turn leads to an increase in the diagnostic frequency. In this way the procedure can also be deployed in hybrid vehicles or in those with a start-stop function.

In the aforementioned diagnostic sequence, the measurement of the compensation gradient takes place right after the vacuum degradation in the phase denoted with Roman numeral IV in FIG. 2. In this phase the same partial pressure of the hydrocarbons exists as was the case when measuring the vacuum degradation in Phase II. The extraction of the hydrocarbons from the accumulator 9 takes place in Phase I, in which the fuel tank ventilation valve is open and, therefore, before the actual vacuum degradation. Between the vacuum degradation (Phase II) and the measurement of the compensation gradient (IV), i.e. in the phase denoted with Roman numeral III when the check valve 11 is open, air alone flows into the system. This inflowing air has in no way a negative influence on the partial pressure of the hydrocarbons. As a result the outgassing is the same when measuring the vacuum degradation and the compensation gradient. This fact leads to an increase in the precision of the diagnosis in contrast to inherently known procedures, in which hydrocarbons are extracted from the fuel tank ambiance between the measurement of the compensation gradient and the acquisition of the vacuum degradation. If in fact hydrocarbons are extracted from the fuel tank ambiance, their partial pressure in the fuel tank ambience is decreased, whereas the vapor pressure of the hydrocarbons stays the same. This affects the outgassing of the fuel to such an extent that the system tries to come into equilibrium. The outgassing during the vacuum degradation in the procedure known from the state of the art is consequently greater when measuring the compensation gradient, whereby the result from the procedure known from the state of the art is distorted—in contrast to the previously described procedure.

The invention claimed is:

1. A method of diagnosing a fuel tank leak in a fuel tank ventilation system, comprising a fuel tank, an accumulator for fuel vapors and a fuel tank ventilation valve opening out into an intake manifold of an internal combustion engine, wherein the fuel tank, the accumulator and the fuel tank ventilation valve are connected by way of a system of lines and wherein the accumulator has an aeration line with a check valve, the method comprising:
    immediately before turning off the internal combustion engine, closing the check valve and opening the fuel tank ventilation valve to generate a vacuum in the fuel tank ventilation system;
    acquiring a vacuum degradation at predetermined points in time when the fuel tank ventilation valve is closed;
    opening of the check valve in order to bring about a pressure equilibrium with the ambient pressure;
    again closing of the check valve;
    acquiring a pressure increase over time at least a predetermined time interval and determining a compensation variable; and
    determining the presence of a leakage from behavior of the vacuum degradation over time, while taking into account behavior of the compensation variable over time.

2. A method according to claim 1, wherein the compensation variable is a compensation gradient.

3. A method according to claim 1, further comprising adjusting the vacuum to a constant, predetermined value.

4. A method according to claim 3, wherein the vacuum is maintained at a constant value by means of a two-step control or by means of a continuous closed-loop control.

5. A method according to claim 1, wherein the internal combustion engine is turned off during the acquisition of the behavior of the vacuum degradation over time.

6. A method according to claim 1, wherein the check valve is closed and the fuel tank ventilation valve is opened in order to generate a vacuum in the fuel tank ventilation system if a diagnostic signal is constructed in an engine management system.

7. A method according to claim 6, wherein the diagnostic signal is produced, as soon as a forthcoming shutdown of the internal combustion engine is presumed from the parameters of the engine management system.

8. A method according to claim 7, wherein a variable or a combination of the following variables serves as a parameter of the engine management system: an engine rotational speed, an operating state or a gear stage of the internal combustion engine.

9. A method according to claim 8, wherein the internal combustion engine is only then turned off if at least one variable of the engine management system was produced, which characterizes a desired specifiable vacuum in the fuel tank ventilation system.

10. A method according to claim 9, wherein the internal combustion engine is turned off only after a time delay for the actuation of the switching equipment to turn off the internal combustion engine.

11. A method according to claim 1, wherein the vacuum in the fuel tank is measured by a pressure sensor.

* * * * *